United States Patent [19]

Hurd et al.

[11] Patent Number: 5,094,554
[45] Date of Patent: Mar. 10, 1992

[54] ADDRESSING MACHINE

[75] Inventors: Bruce E. Hurd, Monroe; Lawrence F. Eisner, Cheshire, both of Conn.

[73] Assignee: Bryce Office Systems, Inc., Oxford, Conn.

[21] Appl. No.: 596,040

[22] Filed: Oct. 11, 1990

[51] Int. Cl.⁵ .............................................. B41J 11/20
[52] U.S. Cl. ...................................... 400/59; 400/126; 400/636.3; 346/75; 101/93.11
[58] Field of Search ................... 101/126, 93.11, 93.04; 400/126, 56, 55, 57, 611, 617, 634, 635, 636, 636.3, 637.1, 641, 543, 521, 663, 664; 346/75

[56] References Cited

U.S. PATENT DOCUMENTS

| | | | |
|---|---|---|---|
| 4,056,183 | 11/1977 | Beery | 400/636 |
| 4,220,081 | 9/1980 | Hawkinson | 101/93.11 |
| 4,369,450 | 1/1983 | Iwagami et al. | 346/75 |
| 4,493,566 | 1/1985 | McMahon et al. | 400/59 |
| 4,608,575 | 8/1986 | Morgan | 400/126 |
| 4,714,932 | 12/1987 | Reynaud | 346/75 |
| 4,775,868 | 10/1988 | Sugiura | 346/75 |
| 4,814,795 | 3/1989 | Kuester et al. | 400/56 |
| 4,858,907 | 8/1989 | Eisner et al. | 271/124 |
| 4,893,990 | 1/1991 | Frohlich | 346/75 |
| 5,000,597 | 3/1991 | Kilb et al. | 400/636 |

FOREIGN PATENT DOCUMENTS

| | | | |
|---|---|---|---|
| 2534439 | 4/1976 | Fed. Rep. of Germany | 400/636 |
| 2734815 | 2/1978 | Fed. Rep. of Germany | 400/126 |
| 0043432 | 4/1977 | Japan | 400/126 |
| 0061587 | 4/1982 | Japan | 400/641 |
| 0087379 | 5/1982 | Japan | 400/55 |
| 0131086 | 8/1983 | Japan | 400/636.3 |
| 0199275 | 11/1984 | Japan | 400/56 |
| 0123561 | 6/1986 | Japan | 400/55 |
| 0128777 | 6/1987 | Japan | 400/59 |
| 0273879 | 11/1987 | Japan | 400/59 |

OTHER PUBLICATIONS

"Spring Loaded Round Platen", IBM Tech. Discl. Bulletin, vol. 26, No. 4, 9/83, pp. 1834-1835.

Primary Examiner—Eugene H. Eickholt
Attorney, Agent, or Firm—Nixon & Vanderhye

[57] ABSTRACT

Letter quality addressing is possible at production speeds. A feeding and transport system positively feeds discrete media elements to be addressed (such as envelopes) past a number of print heads in a positive manner to maintain consistent and proper alignment of the printed text on the media elements. First and second feed rollers feed the media elements to a pair of pinch rollers, the operation of the first roller being interrupted once a media element reaches a predetermined position. A selector bar with abrasive strips is associated with the second feed roller. The pinch rollers feed the media elements onto endless transport belts, with transport wiper plates disposed on top of the belts to hold the media elements in contact with the belts. The transport wipers comprise plates mounted by levers at opposite ends in such a way that an element may easily move under a plate, but is held tighter by the plate as it moves along it. At the end of the transport belts, an exit roller holds the envelopes generally horizontal until they have almost completely cleared the belts, so that they do not smear previous envelope addresses. The print heads preferably are ink jet print heads having the orifices thereof mounted at about an 87° angle with respect to the horizontal. The print heads may have the vertical spacing from the media elements adjusted simultaneously with the adjustment of the spacing of the selector bar from a second feed roller, and are mounted on carriages for horizontal adjustment.

29 Claims, 10 Drawing Sheets

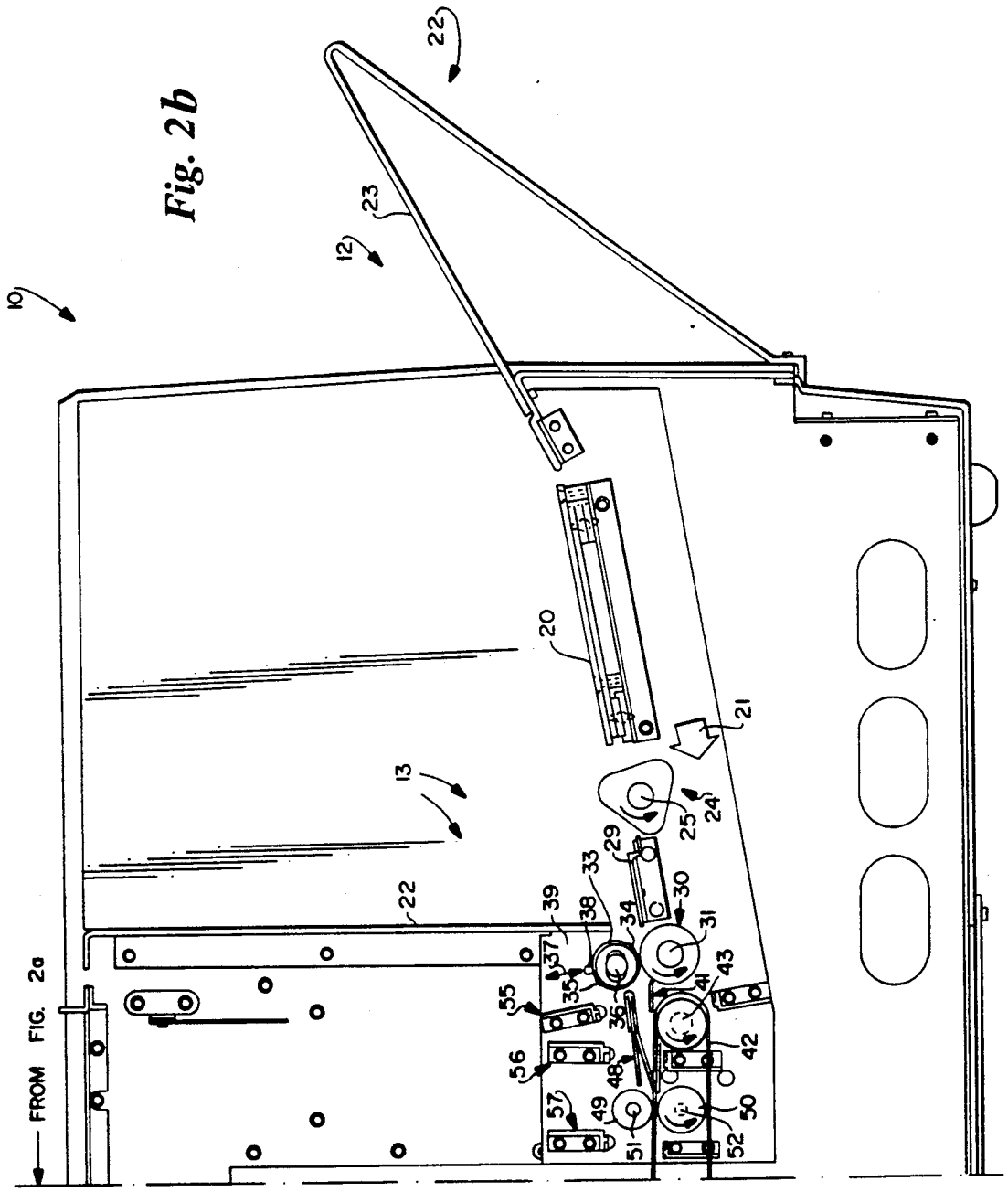

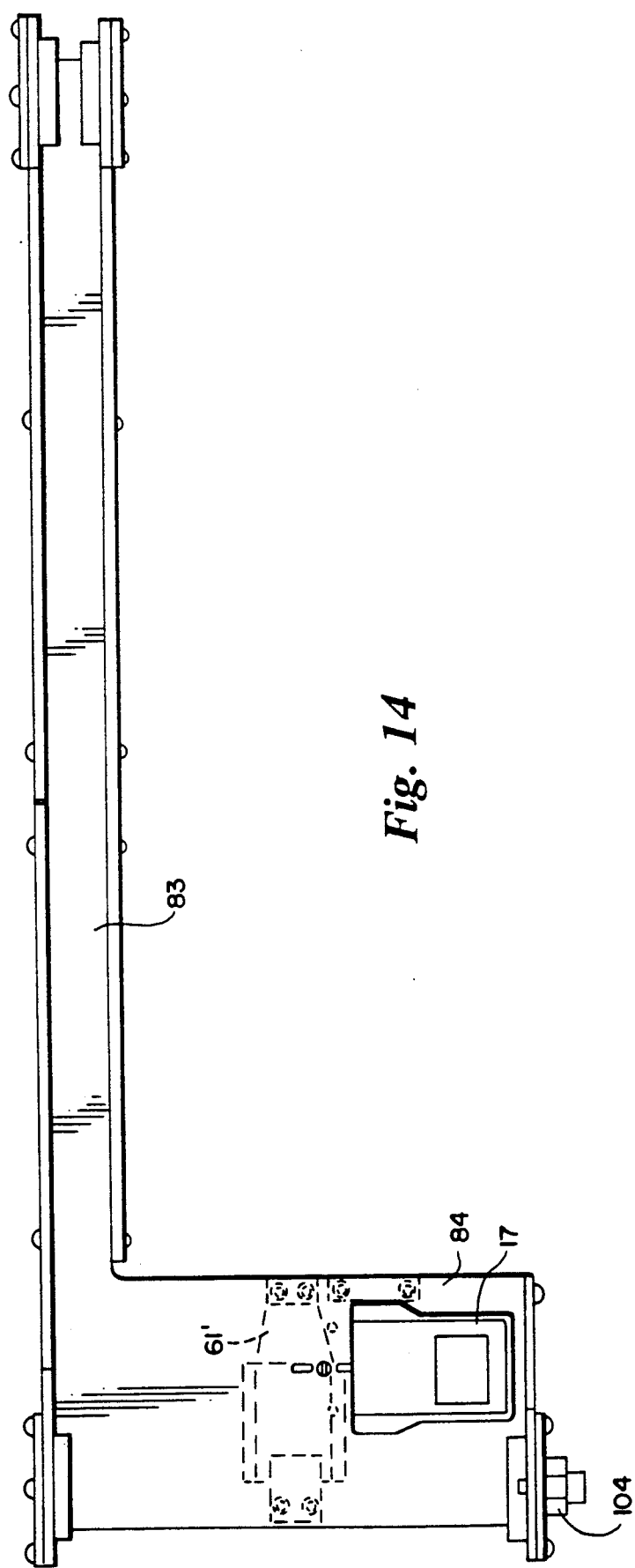

ADDRESSING MACHINE

BACKGROUND AND SUMMARY OF THE INVENTION

There is a substantial need for machines that are capable of high speed, high quality addressing of discrete media elements, such as envelopes, cards, flats, newspapers, or the like. When media elements are directly printed rather than having address labels applied thereto, they present a much better appearance. The appearance alone may be the difference between a recipient discarding the media without even examining it carefully, or responding to the media element. The quality nature of the print also is important in order minimize postage since the printing of bar codes on media (which must be printed in a high quality manner to be effective) speeds delivery of the media and may significantly reduce postage.

According to the present invention, machinery is provided which is capable of providing high speed, high quality addressing. Utilizing the machine according to the present invention, it is possible to print near letter quality media elements at up to 10,000 per hour, and letter quality elements at up to 6,000 per hour. The media handled can be anything from 3×5 inches up to 12 ¼×24 inches and up to ⅛ of an inch thick. The print area may be adjusted within a wide range so that it is properly positioned on the media, depending upon the size and composition of the media, and is capable of printing a complete address, including the postal bar code.

The desirable results are achieved according to the invention by utilizing ink jet printers which are positioned above transport belts which move the media therepast at a high speed. The ink jet printers are mounted so that the orifices thereof will not be clogged by rebounding ink particles, yet there is no necessity for a wiper for wiping ink particles off of the print heads. The feeding and transporting system in a machine according to the invention positively feeds each of the individual media elements to and past the print heads in a precisely controlled manner so that the printing is in a uniform position on the media elements, and so that there is no slippage between the media elements and the transport mechanisms that could cause blurring or other non-uniformities in the printing quality.

Media elements are fed from a substrate by first and second feed rollers to a pair of pinch rollers and then onto a plurality of endless transport belts having transport wipers holding the edges of the media elements in positive contact with the transport belts. The first feed roller feeds the media element to the second feed roller, which in turn feeds the media element to the pinch rollers. Once the media element is between the second feed roller and the pinch rollers, operation of the first roller is terminated to ensure no double feeding. A selector bar—the position of which is adjustable with respect to the second feed roller in order to accommodate media of different thickness—is positioned above the second feed roller and has an abrasive strip thereon which will engage the media elements and ensure singulation thereof to the second feed roller. The selector bar may have circumferentially spaced abrasive strips so that when one strip wears out, the selector bar may be rotated so that a new abrasive strip is properly positioned with respect to the second feed roller.

The pinch rollers are biased together by loop springs, and the surface of at least one of the pinch rollers is deformable, and the pinch rollers may move apart—though always biased together by the loop springs—to automatically accommodate media elements of different thickness.

Transport wipers overlay transport belts on opposite sides of the print heads. The transport wipers are mounted by leaf springs or like levers at the leading and trailing ends thereof, the leading edge—with respect to the direction of transport —making an angle less than the angle at the trailing edge, so that the media element may easily enter the area between the transport wiper and the transport belt, but as it moves along the wiper powered by the belt, the wiper will exert a larger force retaining it in place.

The print heads are mounted on movable platforms. Typically, seven print heads would be mounted on one movable platform, while an eighth print head—the print head for printing bar code, or an eighth address line—is mounted on a second platform. The position of the platforms in the horizontal direction perpendicular to the direction of transport of the media elements may be adjusted, as may the vertical spacing between the print heads mounted on the platforms and the media elements moving therepast. The vertical spacing is changed by rotation of eccentric shafts within outer tubes, with the selector bar and the mounting tubes for the print heads being positively tied together so that adjustment of the vertical spacing of one automatically adjusts the vertical spacing of the others by the same amount. The second platform may also be moved in the horizontal direction perpendicular to the direction of transport to position the eighth print head either in an operative printing location, for printing an eighth line of address, or in a location for printing bar code.

Typically, the print heads are jet printers, and in order to prevent rebounding ink from clogging the orifices thereof—yet without requiring a wiper for wiping the ink from the orifices—the print heads are mounted at a small angle—e.g., about 3° —with respect to the vertical (i.e., they make an angle of about 87° with respect to the direction of transport).

Once the media elements have moved past the print heads, and are about to be discharged into a discharge bin or tray, an exit roller is provided which holds the media elements generally horizontally until they have been almost completely discharged, so that the leading edge thereof will not engage a previously-printed media element and drag across it, smearing the printed address information thereon.

It is the primary object of the present invention to provide for the high-speed, high-quality addressing of media elements. This and other objects of the invention will become clear from an inspection of the detailed description of the invention, and from the appended claims.

BRIEF DESCRIPTION OF THE DRAWINGS

FIGS. 2a and 2b are a side view, with the cover of the machine removed, of internal components of the machine of FIG. 1;

FIG. 6 is a side view of an exemplary transport wiper of the apparatus of FIG. 2a;

FIG. 14 is a top plan view of the carriage for an eighth print head.

DETAILED DESCRIPTION OF THE DRAWINGS

Figure 1:
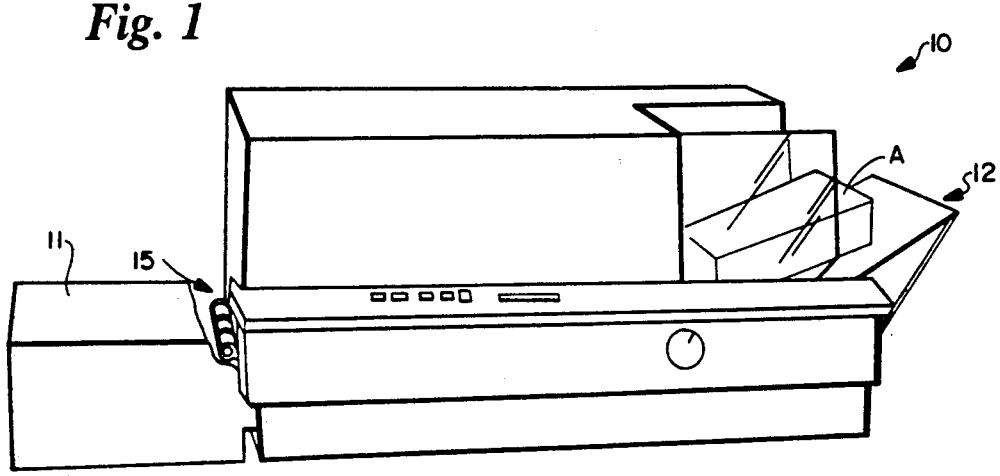
FIG. 1 is a perspective exterior view of an exemplary machine according to the present invention.
Figure 3:
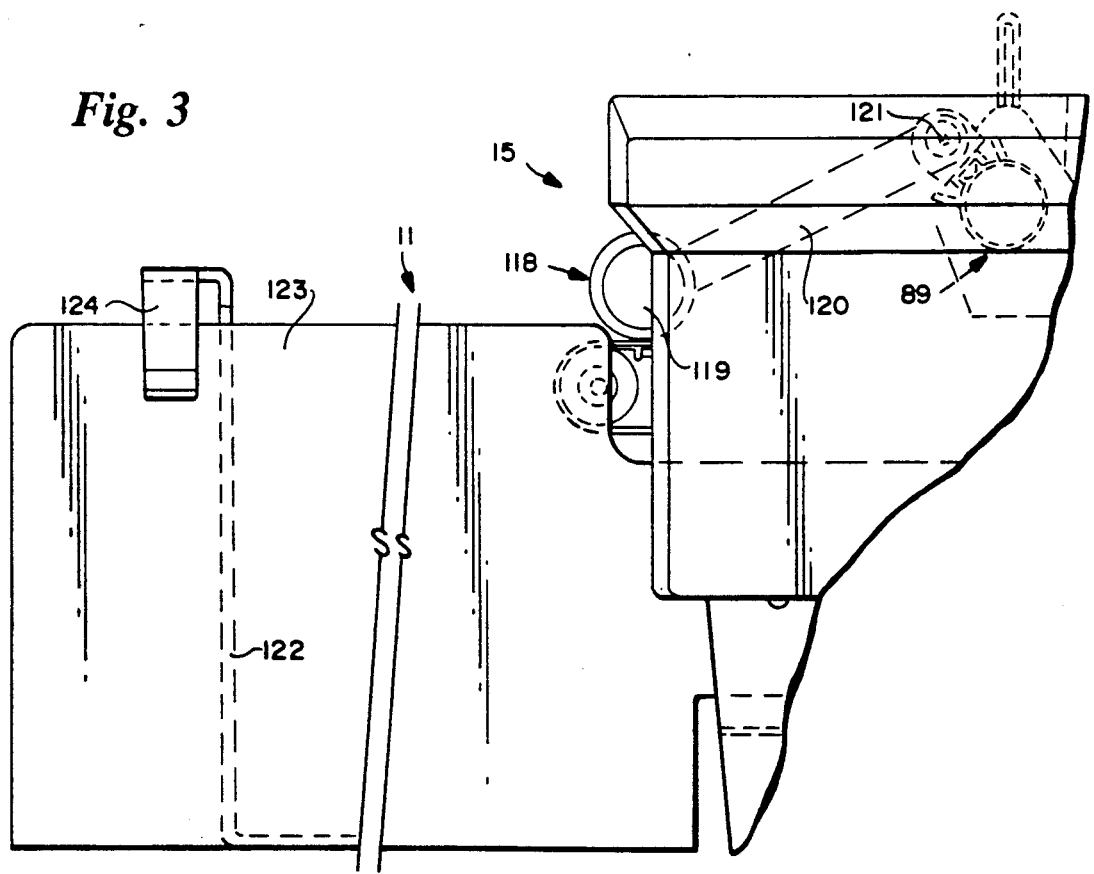
FIG. 3 is a detailed side view showing the discharge end of the machine of FIG. 1 in operative association with a catch tray or bin.
Figure 4A:
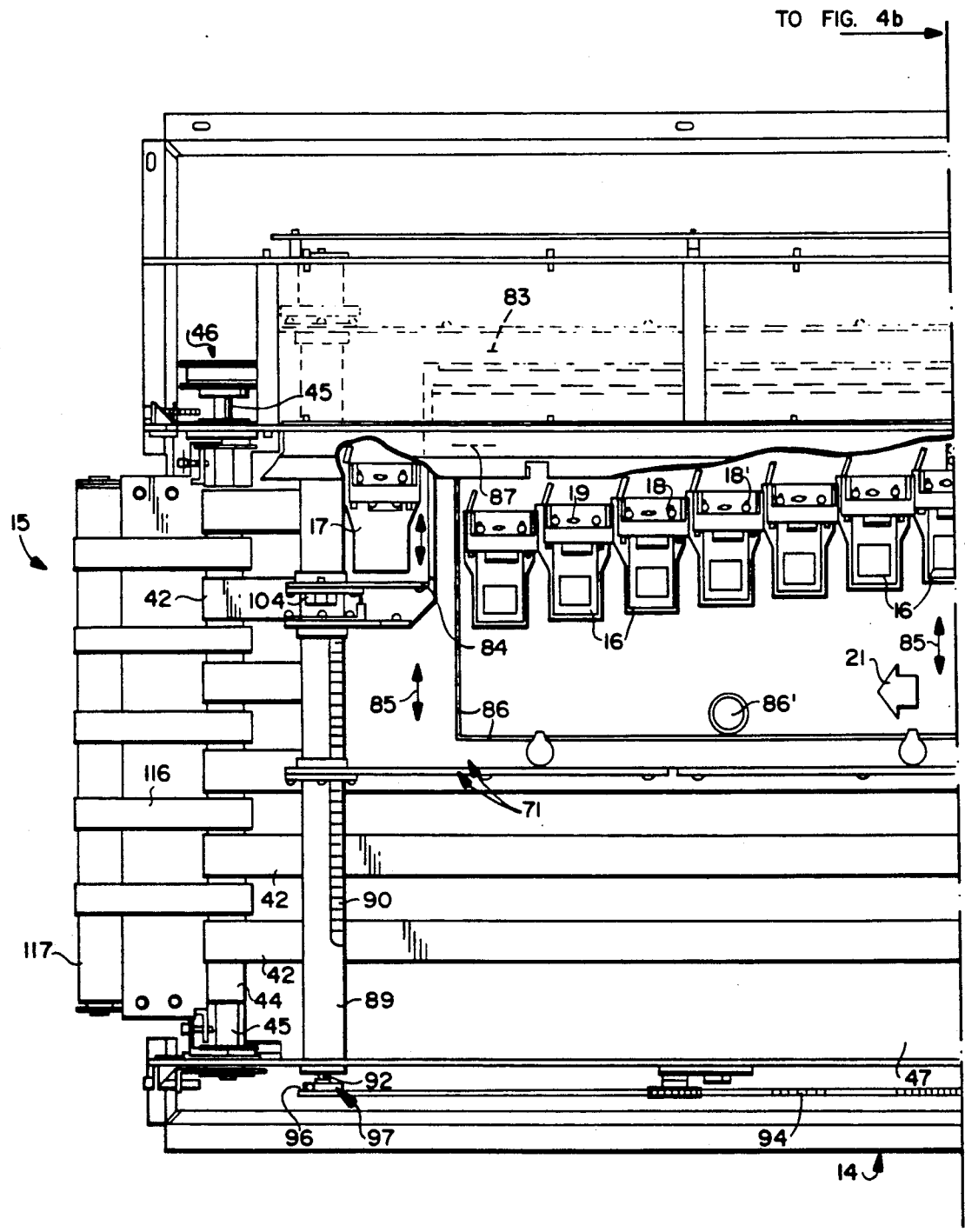
FIGS. 4a and 4b are a top plan view of the internal components of the machine seen in FIGS. 2a and 2b.
Figure 4B:
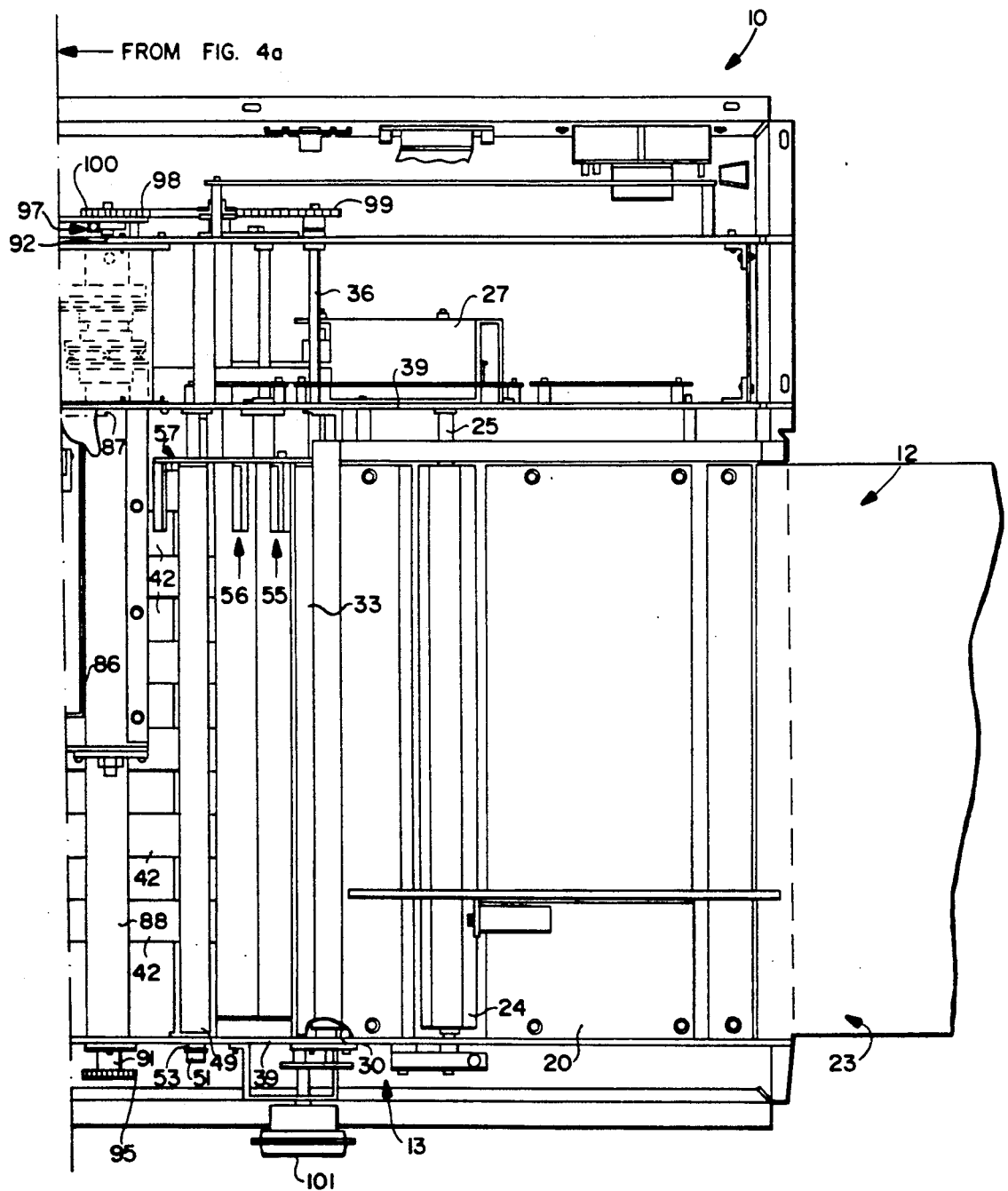

An exemplary machine according to the present invention is shown generally by reference numeral 10 in FIG. 1, 2 and 4. The machine 10 is preferably adapted to be used with a catch tray 11, or a conveyor (FIGS. 1 and 3). Media elements A (see FIG. 1) to be addressed are fed in at the entry end 12 of the machine 10, are engaged by the feeding means 13 to be fed to the transport means 14, and ultimately discharged from the exit end 15 of the machine 10. The transport means 14 moves the discrete media elements past a plurality of print heads, such as a first group of print heads 16, and a separate print head 17 (see FIGS. 2 and 4). The media elements A may comprise envelopes, cards, flats, or newspapers, or the like. Typically, the media elements may have size ranging from 3×5 inches up to 12 ¼×24 inches, with a thickness of up to ⅛th inch. Except for details of operation of the feed rollers, the details of the selector bar, and the positioning of sensors, the inlet 12 and feeding means 13 are substantially identical to those shown in U.S. Pat. No. 4,858,907, the disclosure of which is incorporated by reference herein. The positions of the heads 16 may be adjusted with eccentric screws 19 moving the heads as pins 18 move in elongated slots 18'.

At the inlet end 12 of the machine 10 a substrate 20 is provided upon which the media to be printed rests. Exteriorly of the substrate 20 (that is upstream thereof in the direction of the media transport 21) is a bin extension 22, having a support surface 23 thereof that makes an angle with respect to the substrate 20 so as to be effective to take some of the weight of the stack media elements off the bottom element which engages the substrate 20. The substrate 20 cooperates with the feed wall 22' against which the leading edges of the media elements are stacked.

Figure 11:
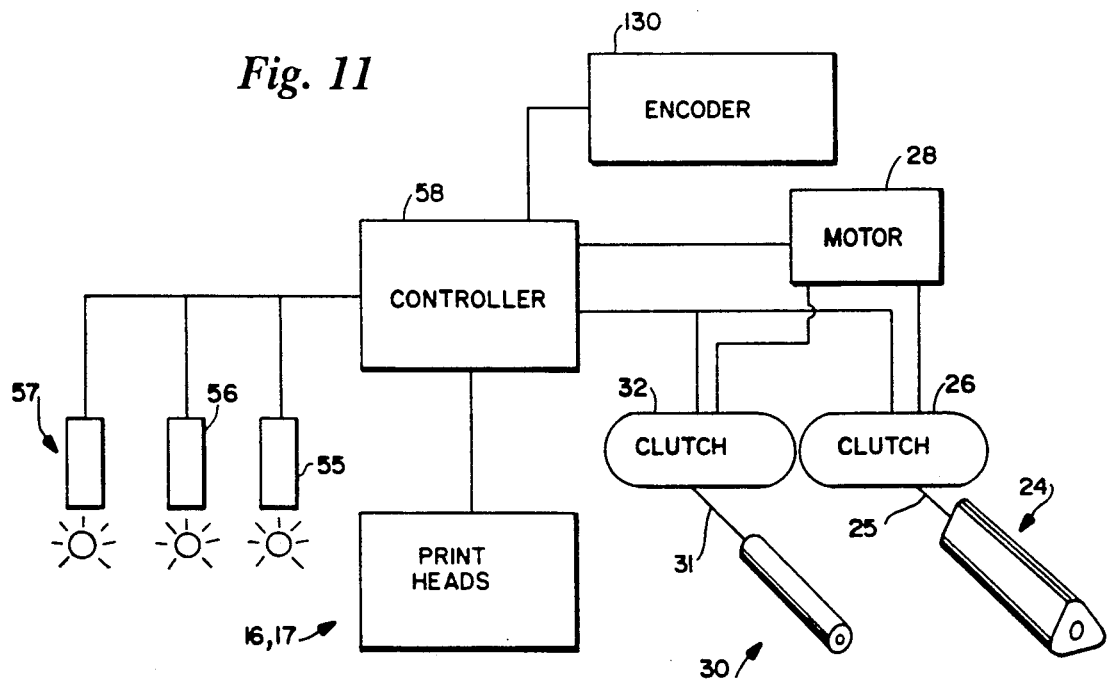
FIG. 11 is a control schematic for some of the component parts of the machine of FIGS. 2 and 4.

Adjacent the substrate 20 in the direction of transport 21 is a first or upper feed roller 24 which preferably has a non-circular (e.g., rounded apex triangle) cross-sectional configuration, and it is rotatable about a shaft 25 extending in a horizontal dimension essentially transverse to the direction of transport 21. The direction of transport 21 preferably is also horizontal. The shaft 25 is connected to a clutch 26 (seen schematically in FIG. 11) mounted by a clutch bracket 27 (see FIG. 4), the clutch being connected up to a motor 28 (see FIG. 11) for powering it.

Downstream of the first feed roller 24 in the direction of transport 21 is the support surface 29, and then next to that a second or lower feed roller 30. The roller 30 is mounted for rotation about shaft 31, the shaft 31 being parallel to the shaft 25 perpendicular to the direction of transport 21. The shaft 31 is connected up to a second clutch 32 (see FIG. 11) distinct from the first clutch 26, but also powered by motor 28. The clutch 32 is also preferably mounted by bracket 27.

Mounted above the second feed roller 30 in operative association therewith is a selector bar 33. The selector bar 33 does not rotate, but rather provides a stationary guide for singulating the media elements A during guiding of the media elements from the surface 29 into operative association with the rotating periphery of the second feed roller 30. To facilitate this guiding function, the selector bar 33 preferably has a first abrasive strip 34 on the outer periphery thereof, and positioned as illustrated in FIG. 2—that is, just above and to the inlet side of the topmost rotating portion of the circumference of the feed roller 30. The abrasive strip 33 may be any conventional abrasive material that is bound with an adhesive or the like to the external surface of the bar 33, and extends essentially parallel to the shaft 31. Since the abrasive of the strip 34 will eventually be worn away, it is preferable to provide a second abrasive strip 35 on a circumferential portion of the selector bar 33 remote from (e.g., 180°) the strip 34 so that the selector bar 33 may be repositioned with the strip 35 in place of the strip 34, and thereby the life of the selector bar 33—before it need be sent back to the factory for refurbishment—may be doubled.

The selector bar 33 preferably comprises an outer tubular component which has the abrasive strips 34, 35 thereon and includes an inner eccentric shaft 36 which engages the exterior tube of the bar 33. Rotation of the eccentric shaft 36 effects movement of the bar 33 toward and away from the second feed roller 30 in dimension 37 (see FIG. 2), in mounting slots 38 within side plates 39 mounting the selector bar 33. This allows adjustment of the spacing between the bar 33 and the second feed roller 30 to accommodate media elements A of different thicknesses, e.g., from extremely thin paper sheets, to newspapers up to ⅛th inch thick.

From the second feed roller 30, the media elements A being transported are fed over a bridge piece 41 to transport section 14, which will transport the media elements past the print heads 16, 17. The transport elements within the section 14 preferably comprise a plurality of spaced (in the dimension of elongation of the shafts 25, 31) endless transport belts 42 which are mounted at the first end thereof in the transport direction 21 by an idler roller 43, and at the furthest end thereof in the transport direction 21, adjacent the discharge 15, by a powered roller 44. The axes of rotation of the rollers 43, 44 are parallel to the shafts 25, 31 (i.e., substantially perpendicular to the transport direction 21). The axis of rotation of the drive roller 44 is defined by shaft 45 (see FIG. 4), which is connected to a belt and pulley assembly 46 or the like to the motor 28. The uppermost portion of each endless transport belt 42, at the area thereof adjacent the print heads 16, 17, rides over a belt support plate 47.

A guide assembly 48 may be provided above the inlet portions of the belts 42 to help guide media element A into the transport section 14, and in order to assist in clearing media elements from the feeding section 13 to the transport section 14 while preventing slippage with respect to the belts 42, upper and lower pinch rollers 49 and 50 preferably are provided. The pinch rollers 49, 50 preferably are constructed such as disclosed in U.S. Patent No. 4,858,907, being rotatable about shafts 51, 52 which are parallel to the rollers 43, 44 and shafts 31, 25, with loop springs 53 (see FIG. 4) at opposite ends thereof biasing the shafts 51, 52 and the rollers 49, 50 toward each other—except that the loop springs 53 exert the same force, instead of differential forces as in said patent. The shaft 51 is mounted in a vertically-elongated slot (not shown) inside plates 39 so that it may move toward and away from the roller 50, under the bias of loop springs 53 to automatically accommodate media elements A of different thicknesses. Preferably, the surface of at least one of the elements 49, 50 is deformable (e.g., has an elastomeric material thereon).

Mounted between the second feed roller 30 and the pinch rollers 49, 50 are first and second photosensors 55, 56, and mounted just downstream of the pinch rollers 49, 50 in the transport direction 21 is a third photosensor 57. These photosensors sense the position of media elements A, or the leading and trailing edges thereof, to control various components through a controller 58 (see FIG. 11), as will be hereinafter described.

In the transport section 14, it is very important that the media elements A be held in proper position with respect to the belts 42, and the print heads 16, 17. No slippage between the media element and the belt can occur if the printing is to be distortion free and precisely aligned from piece to piece, and within each piece. In order to accomplish this important function, transport wipers are provided. The pinch rollers 49, 50 feed each of the media elements A into operative association with the transport wipers. In the preferred embodiment illustrated in the drawings, e.g., see FIG. 2a, an entry transport wiper 59, one or more (e.g. four) main transport wipers 60 (e.g. 60, 60'), and one or more exit transport wipers 61 (e.g. 61, 61') are provided.

Figure 2A:
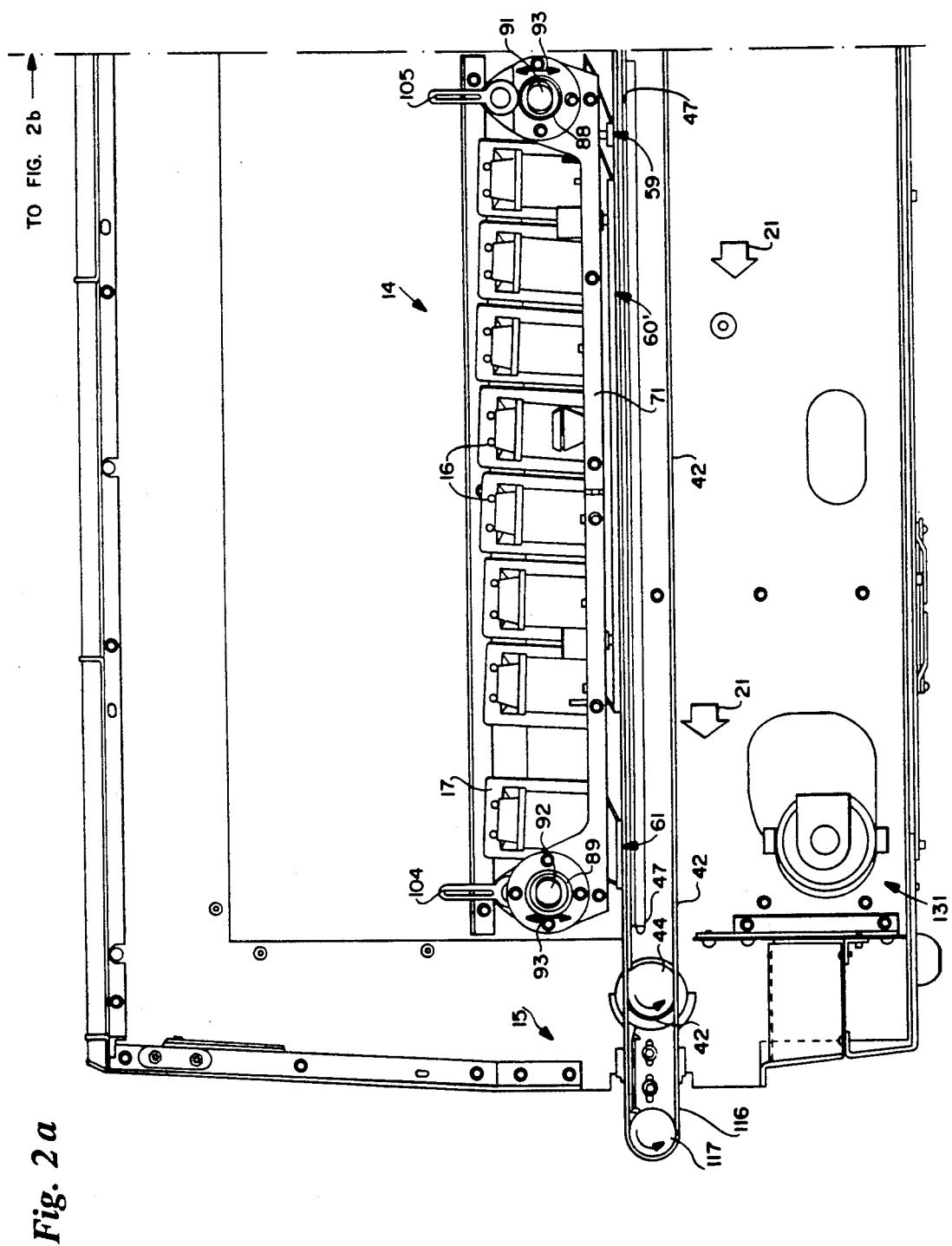
Figure 10:
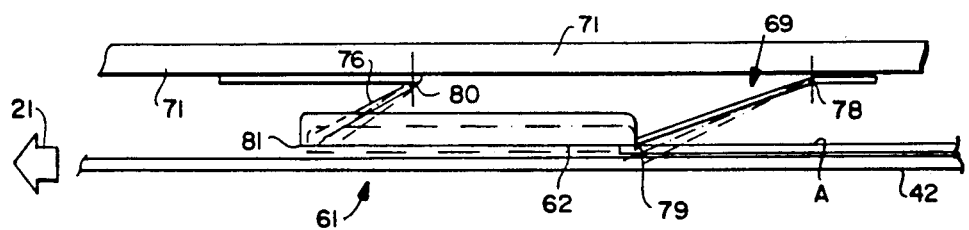
FIG. 10 is a side view showing the exemplary movement and relative positioning of the components of an exemplary transport wiper according to the invention.
Figure 13:
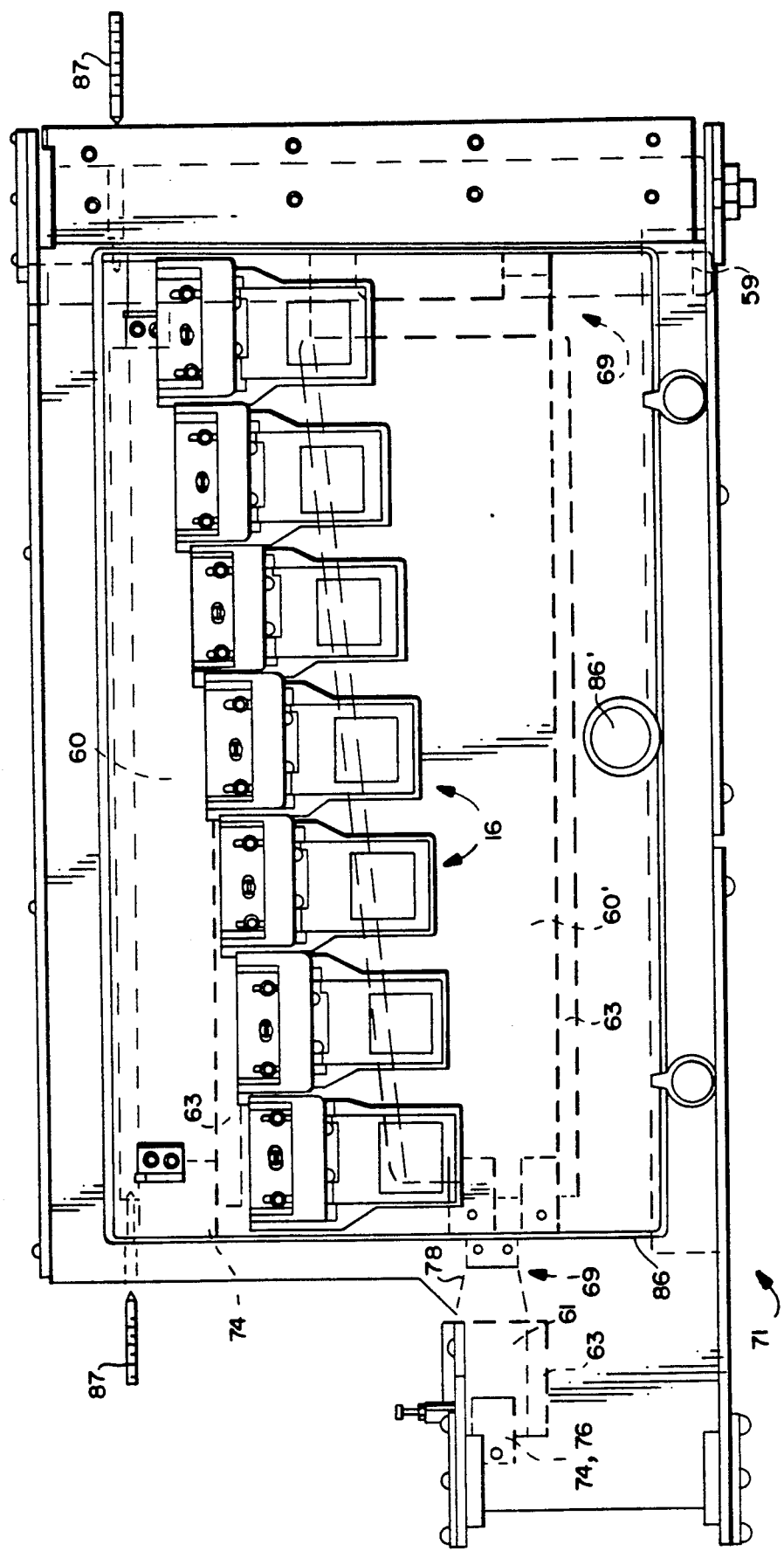
FIG. 13 is a top plan view of th carriage for seven print heads, with the wipers shown underneath it, in dotted line.

Details of exemplary transport wipers according to the invention are illustrated in FIGS. 6 through 10. The main transport wiper 60 is illustrated most clearly in FIGS. 6 through 9, and main wiper 60' is seen in FIGS. 2a and 13 while the trailing wiper 61 is illustrated in FIGS. 10 and 13. The only significant difference between the wipers 60, 60', 61, 61' is their length, width, and shape. The entry transport wiper 59 is like the wipers 60, 60', 61, 61' except that it does not have a trailing lever.

The transport wiper 60 comprises a plate 62 having a very smooth bottom surface, adapted to engage the media element A and/or belt 42. A particularly desirable material is stainless steel, e.g., a 0.006 inch thick stainless steel plate with a very smooth bottom surface finish. While the dimensions are not particularly critical, the plate 62 typically could have a width of about 1.15 inches, approximately the width (or more than) one of the belts 42 (e.g., the belts 42 may have a width of about one inch and a spacing between them of about one inch). It is necessary for the width of the plate 62 is greater than the spacing between the belts 42. The side edges of the plate 62 are turned up to form flanges 63 which make a positive angle 64 (e.g., about 30°) with respect to the horizontal so that if the wiper assemblies 60, 60', 61, 61' are moved in a horizontal dimension parallel to the rollers 43, 44 (perpendicular to the side edges of the belts 42), they will not engage the edges of the belts and cause damage. The top surface of each of the plates 62 preferably has a sound dampening material, e.g., an elastomeric or acoustical material, 65 provided thereon to minimize vibration noise. Also, the leading and trailing ends of the flanges 63 are radiused, as illustrated at 66 in FIG. 9.

The plates 62 have a first end 67 which is the leading end in the direction of travel 21 of the media elements A, and a second end 68 which is the trailing end in the transport direction 21. The plate 62 is mounted so that the leading end 67 thereof may be cammed upwardly by a media element A more easily than the trailing end 68 thereof. This is accomplished by utilizing lever means, such as lever elements 69, 70, mounting the plates 62 to the carriage frame 71 for the print heads 16. The leading end lever 69 preferably is formed with a leaf spring material or the like, and has the leading end thereof attached by screws passing through opening 72 (see FIG. 7) into the carriage 71, the main body of the lever 69 extending rearwardly downwardly therefrom to connection to the front of the plate 62 (or being integral therewith), and making an angle 73 with respect to the transport direction 21. The trailing lever also is formed of leaf spring material, or the like, and has a mounting portion 74 thereof which is connected by screws passing through opening 75 (see FIG. 7) to the carriage 71, with the actual lever arm portion 76 thereof extending from the leading edge of the mounting plate 74 to the trailing edge 68 of the plate 62. The lever 76 makes an angle 77 with respect to the transport direction 21. Levers 69, 76 need not be articulated, but rather pivot points will necessarily be provided at the portions 78, 79, 80 and 81 thereof. While the angles 73, 77 will change as the plate 62 pivots about lever arms 69, 70, initially the angle 73 is substantially less than the angle 77 so that the leading edge 67 of the plate 62 is easily cammed upwardly by a discrete media element A, while as the element A moves in the direction of transport 21, the downward biasing force provided by the plate 62 to clamp it to the belt 42 increases. In one exemplary embodiment, the angle 77 is about 30°, while the angle 73 is about 15°.

FIG. 10 schematically illustrates operation of one of the transport wipers, in this case, the exit transport wiper 61, the movement of the longer entry lever 69, shorter exit lever 76 and plate 62 with respect to the belt 42 being shown as a media element A (e.g., envelope) to be printed cams the wiper plate 62 upwardly as it is moves in the transport direction 21. The initial position of the wiper 61 is shown in dotted line, and its cammed upward position in solid line in FIG. 10.

The main frame or carriage 71 for mounting the print heads 16, mounts all of the print heads except for one (that is, the seven print heads 16 illustrated in FIGS. 4a and 4b), while the second carriage 84 mounts the other print head 17, having an extension 83 (see FIGS. 13 and 14) going around carriage 71. Note the relative positions between the print heads 16 in both the direction of transport 21 and the dimension of elongation of the shaft 25 and associated parallel elements (i.e., see dimensional arrows 85 in FIG. 4). A pivoted cover 86, pivoted about a pivot pin 87, may be provided for mounting the print heads 16, and which can be swung up about the pivot pin 87 using handle 86' for pivoting the print heads 16 out of the way, for cleaning.

Typically, the print heads 16 print seven address lines, while the print head 17 either prints an eighth address line, or bar code. It is held adjacent the bottom of the media to be printed and away from the heads 16 when printing bar code. Where the printer 17 prints bar code, it is preferred that the controller 58 scan the address information fed to the machine 10 for valid zip code information, and create the bar code from the zip code information and thereby control the printer 17. This, and various other control aspects of the components according to the invention, may be the same as in FIGS. 11 through 13 of said U.S. Pat. No. 4,858,907.

The carriage 71 is mounted for movement in the dimension 85 by carriage support tubes 88, 89. A scale 90 preferably is provided on the support tube 89 to indicate the positioning of the carriage 71 along the tubes 88, 89—i.e., in the dimension 85. The transport wipers 60, 60', 61, 61 are preferably provided on both side edges of the carriage 71 (that is, on opposite sides of the print heads 16), as seen in FIG. 13. Since the wipers are wider than the space between the belts 42, when positioning the carriage 71 in the dimension 85 care need not be taken to see that wipers 59-61 are in substantial registry with a transport belt 42. This movement in dimension 85 can be as much as seven inches, allowing precise positioning of the printing area for a wide variety of different types and sizes of printing media A. The carriage 84 can be slid on tubes 88, 89 too, and the carriage 84 may be moved relative to carriage 71 to position head 17 to print eight lines of address, if desired.

It is important to be able to adjust the spacing of the print heads 16, 17 vertically—i.e., from the surface of the media elements A that are to be printed. This is accomplished by providing eccentric shafts 91, 92 within the tubes 88, 89. The eccentric shafts 91, 92 engage the tubes 88, 89 so that rotation of the shafts 91, 92 results in movement of the entire carriage 71 in the dimension perpendicular to the direction of transport 21 and the horizontal dimension 85 (e.g., vertically—see dimensional arrows 93 in FIG. 2a). The shafts 91, 92 have the same eccentricity as the shaft 36 associated with selector bar 33, and all of the shafts 36, 91, 92 are mounted together so that the spacing between the print heads 16 and the transport belts 42 (and the media A supported thereby), as well as the spacing between the selector bar 33 and the second feed roller 30, will always be proportional, e.g., the spacing between the selector bar 33 and the feed roller 30 will be substantially equal to the thickness of the media element, while the spacing from the print head 16 on the top of the transport belts 42 will be thickness of the media element A plus the desired distance the print head 16 is normally provided above the top surface of the media element A.

The simultaneous adjustment of the spacings of the elements 33, 88, 89 is accomplished by tying the tubes 88, 89 together with an anti-backlash chain 94 (see FIG. 4a) extending between sprockets 95, 96 connected to shaft 91, 92 by adjustable locking collars 97, and by tying shaft 36 to shaft 92 utilizing anti-backlash chain 98 connected between sprockets 99, 100, again with an adjustable locking collar 97. Then, by rotating control knob 101, connected to shaft 36, the shafts 36, 91 and 92 are simultaneously rotated a known amount so that the desired proportional spacings are always maintained.

The carriage locks 104, 105 are provided mounted on the carriage 84, 71, respectively, in association with the tubes 89, 88, respectively, to hold carriages 84, 71, respectively, in a position in which they have been moved in the dimension 85 with respect to the tubes 88, 89. When the carriage locks 104, 105 are rotated 90° from the position illustrated in FIG. 2a, they hold carriages 71 and 84 in place with respect to the tubes 88, 89, while in the position as illustrated in FIG. 2a, they allow relative movement therebetween.

Figure 12:
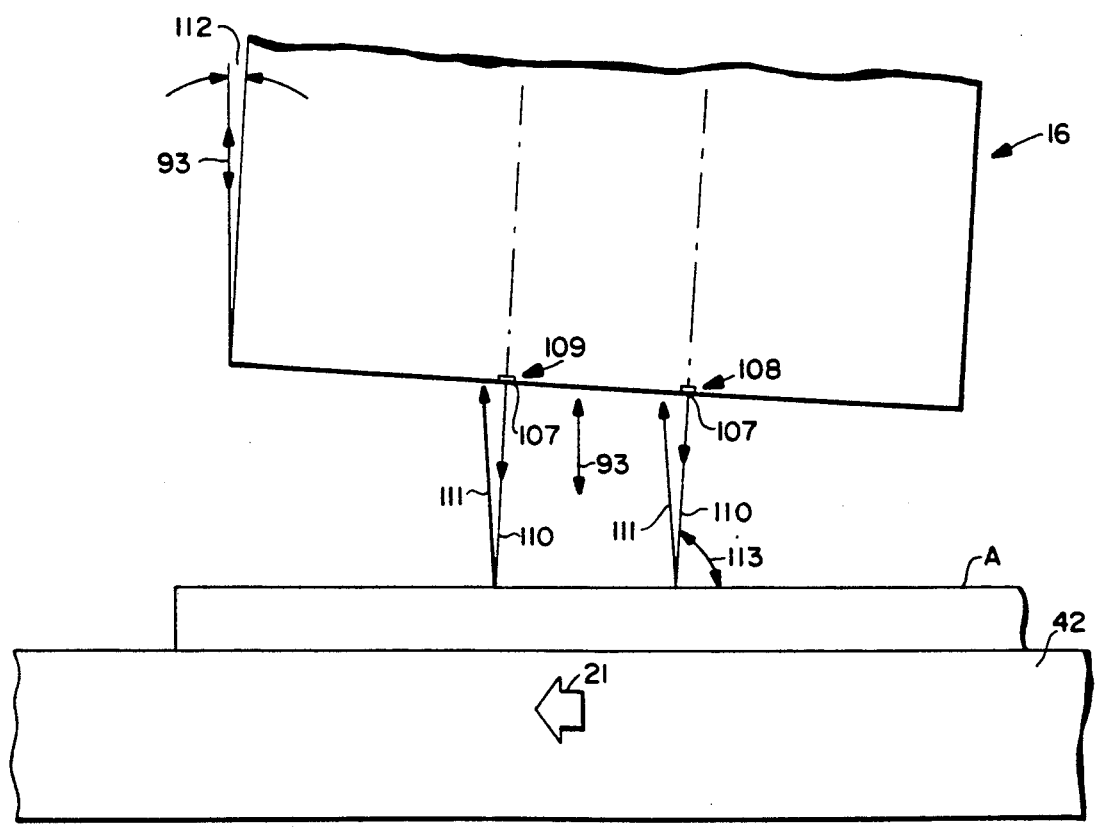
FIG. 12 is a side schematic view showing an exemplary mounting of the print heads according to the invention with respect to the direction of transport 21.
Figure 6:
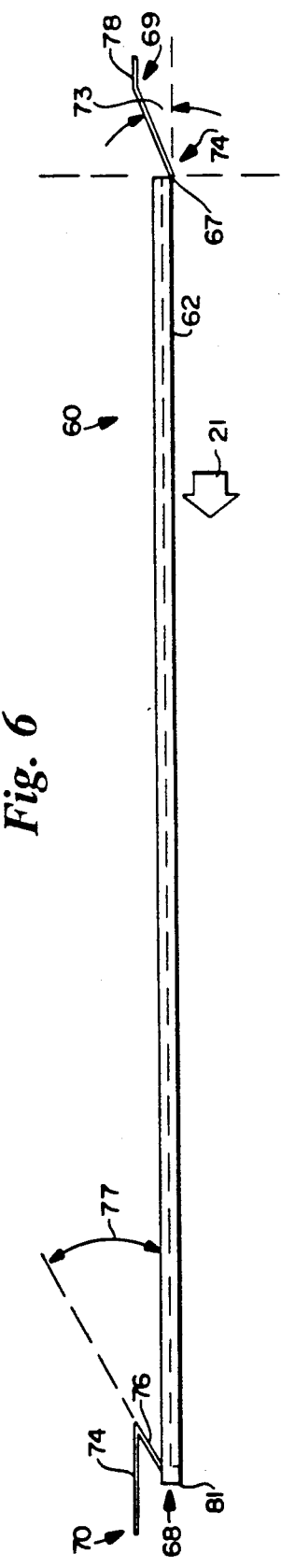
Figure 7:
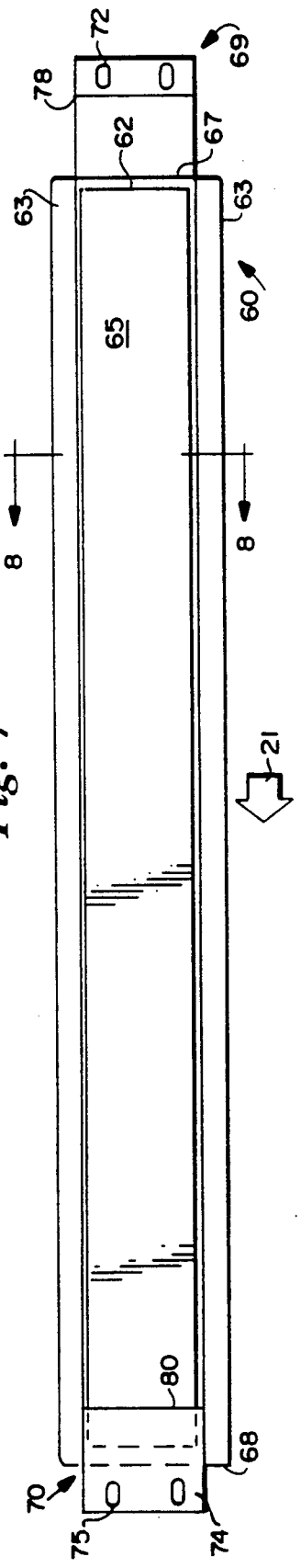
FIG. 7 is a top plan view of the transport wiper of FIG. 6.
Figure 9:
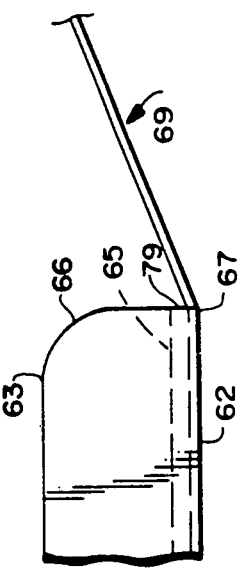
FIG. 9 is a detailed view of the front of the wiper of FIG. 6.
Figure 8:
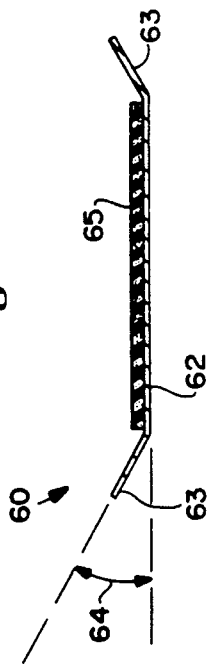
FIG. 8 is a cross-sectional view—taken along lines 8—8 of FIG. 7—of the transport wiper of FIG. 7.

FIG. 12 schematically illustrates the particular positioning of each of the ink jet print heads 16 (and 17) according to the invention with respect to the direction of transport 21, and the vertical 93. FIG. 12 schematically illustrates a conventional ink jet print head 16 having a plurality of orifices or nozzles 107 arranged in banks 108, 109 in the dimension 85. If the nozzles 107 are mounted so that a stream of ink issuing therefrom—illustrated by line 110 in FIG. 12—is perpendicular to the media element A, rebounded ink—illustrated by reference numeral 111 in FIG. 12—will rebound directly up to the orifices or nozzles 107, and eventually clog them unless some sort of a wiper is provided. The necessity for a wiper is avoided according to the invention by mounting the orifices 107 so that the rebounded ink path 111 does not impact them. This is accomplished by mounting the print head 16 so that the center lines of the banks 108, 109 of orifices or nozzles 107 (which are in line with the ink streams 110) are not perpendicular to the direction of travel 21 (i.e., the surface of the transport belts 42). That is, there is a small angular deviation 112 from the vertical 93, which angle 112 may be about 3°. That means that the angle 113 of the ink stream 110 with respect to the direction of transport 21 is about 87° (90° minus 3°).

As the media elements A being printed move past the print heads 16, 17, they move toward the exit end of the machine 10. The elements A preferably are discharged from the belts 42 onto the belts 116, which extend between the drive roller 44 and an idler roller 117. As seen in FIG. 3, an exit idler roller 118 is preferably associated with the belts 116 and idler roller 117 to control the orientation of the elements A as they move out of the discharge end of the machine 10 into the bin or tray 11. The exit idler roller 118 rotates about an axis elongated in the dimension 85, being mounted at one end thereof by a weight 119 connected to lever arm 120 which in turn is connected by pivot pin 121 to tube 89. The idler exit roller 118 is right at the very end of the belt 116 so it has a tendency to keep the discharge media elements substantially horizontal until just before final discharge thereof. This means that they will not have a tendency to drape down into the bin 11, and possibly have the leading edge thereof dragged across the printed address information on the previously discharged media element A, which would result in smudging thereof. The bin 11 preferably has an adjustable backstop 122 which is held in place along the tray sidewalls 123 by locking tab or tabs 124, the backstop 122 being positioned so that media elements A exiting the machine 10 hit it and drop vertically down into the bin 11, again to minimize the possibility of smearing of wet ink applied by the print heads 16, 17.

Figure 5:
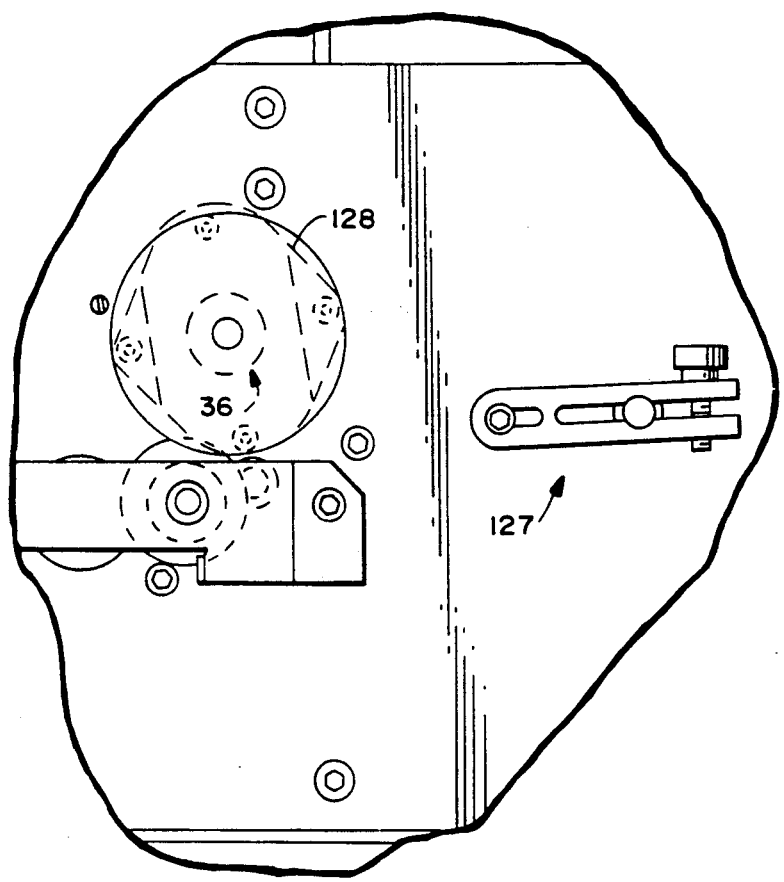
FIG. 5 is a side view of detailed components associated with the selector bar and first feed roller of the apparatus of FIGS. 1, 2a, 2b, 4a and 4b.

Various other features of the exemplary machine 10 according to the invention which have not heretofore been described, which may be utilized therein for maximum utility, are illustrated in FIG. 5. FIG. 5 shows a friction brake 127 which may be associated with the first feed roller 24 to stop rotation of the first feed roller 24 due to its own inertia, thereby preventing misfeeding of short media elements A. FIG. 5 also illustrates a locating plate 128 associated with eccentric bar 36. A similar locating plate is associated with eccentric shafts 91, 92. Such locking plates 128 hold the shafts 36, 91, 92 in the predetermined relative positions in which they have been placed at the factory for the appropriate parallelness with the elements beneath them. Thus, they allow removal of the selector bar 33 and tubes 88, 89, and reinstallation, without requiring new parallelness adjustments.

The apparatus according to the invention may also include an encoder 130 (see FIG. 11) mounted on the transport belt idler shaft so that any belt slippage which may occur on the driven belt shaft will not affect printing quality. Also, a motor encoder 131 (see FIG. 2) may be provided for controlling the motor speed—that is, keeping the motor speed constant.

OPERATION

An exemplary unit 10 according to the invention having been described, an exemplary operation thereof in the printing of an envelope (discrete media element A) will now be provided.

A stack of envelopes is placed on the support surface 20 and extension 23, and the machine is started. The motor 28 drives clutches 26 and 32 so that the feed rollers 24, 30 start rotating, and the bottom envelope in the stack is engaged by the first feed roller 24 and driven in the transport direction 21, so that it impacts the abrasive strip 34 on selector bar 33, and moves into contact with the upper rotating surface of the second feed roller 30. The second feed roller 30 drives it over the bridge 41, and under the photosensors 55, 56 into contact with the pinch rollers 49, 50. In one exemplary (only) operation, the leading edge of the envelope passing past photosensor 56 causes the controller 58 to disengage the clutch 26 so that the first feed roller 24 no longer rotates, and it is quickly brought to a halt by the friction brake 127. The second feed roller 30 substantially continues feeding, however, and when the trailing edge of the envelope passes the photosensor 55, the controller 58 engages the clutch 26 to again start rotation of the first feed roller 24, to start the movement of the next envelope in the stack in the transport direction 21. Feed roller 30 operation may be arrested for a short period of time, however, if desired, using clutch 32.

The pinch rollers 49, 50 hold the envelope tightly on the belts 42 until the trailing edge thereof clears the feed rollers 24, 30 and the leading edge is guided under the entry transport wiper 59. The spacings between the rollers 24, 30, and 30, 49/50, and between the rollers 49/50 and the leading transport wiper 59 are preferably shorter than the shortest length media (e.g., 3×5 cards) intended to be transported. However, the feeding action is so positive according to the invention that even media less than 5 inches in length can be transported and printed.

As the envelope is fed past the photocell 57, the "counting" process for printing is started, the controller 58 controlling the print heads 16, 17 in response to the sensed position so that ink is issued from the nozzles or orifices 107 of the print heads 16, 17 and applied to the envelope in appropriate address lines. Because of the tilted orientation of the print heads 16, 17 the orifices 107 therein will not clog as a result of rebounding ink.

Once the leading edge of the envelope passes under the transport wiper plate 62 of wipers 60, 60' —which is relatively easy due to the small angle 73—the force holding it increases along the length of the wiper plate 62, so that the envelope is held precisely in place, without any slippage with respect to belts 42, until it passes through the entire printing operation. Ultimately, the envelope passes to belts 116 and it is held by exit roller 118 so that it is substantially horizontal until almost to the point of impact on backstop 122, at which time it falls downwardly into the tray 11, without having smeared the earlier printed envelope.

When it is desired to print envelopes of a different size or thickness, the control knob 101 is rotated to provided the desired gaps between the selector bar 33 and second feed roller 30, and between the print head orifices 107 and transport belts 42; and the levers 104, 105 are operated to allow movement of the carriages 71, 84 in the dimension 85 to properly position the print heads 16, 17 with respect to the new size of envelopes so that the address will be printed in the correct location.

It will thus be seen that according to the present invention a printing assembly for printing discrete media elements has been provided which allows high-speed, high-quality addressing. While the invention has been herein shown and described and was presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A printing assembly for printing discrete media elements, comprising:

a frame;

a plurality of print heads;

means for mounting said print heads on said frame;

transport elements for moving discrete media elements past said print heads;

means for powering said transport elements to effect movement of discrete media elements in a transport direction; and means for holding the discrete elements in positive, non-slipping contact with said transport elements during printing on the discrete elements by said print heads, said holding means comprising at least one transport wiper comprising a smooth surfaced plate having first and second ends spaced from each other in said transport direction with the first end preceding the second end in said transport direction, and lever means mounting said plate to said frame at said first and second ends thereof so that said plate may move in a direction perpendicular to said transport direction toward and away from said transport elements.

2. Apparatus as recited in claim 1 wherein said lever means comprising a first lever arm mounted to said first end of said plate and making a first angle with respect to said transport direction, and a second lever arm mounted to said second end of said plate and making a second angle with respect to said first direction; said angles being selected so that there is less force tending to bias said plate into contact with said transport elements at said first end thereof than at said second end, so that the discrete media may readily pass between the plate and the transport elements at said first end thereof, yet is held positively thereby during printing.

3. Apparatus as recited in claim 2 wherein said first angle is less than said second angle.

4. Apparatus as recited in claim 3 wherein said levers are leaf springs.

5. Apparatus as recited in claim 4 wherein said plate has a first surface which engages the transport elements which is smooth, and a second surface opposite the first surface containing sound dampening material.

6. Apparatus as recited in claim 2 wherein said transport elements comprise a plurality of transport belts, including belts positioned on opposite sides of said print heads, and wherein said holding means comprise wiper plates mounted in juxtaposition with said belts on said opposite sides of said print heads.

7. Apparatus as recited in claim 1 wherein said holding means further comprise a plurality of wiper plates associated with each side of said print head, and arranged in line in said first direction, and spaced from each other in said first direction, said wiper plates each mounted by lever means.

8. Apparatus as recited in claim 7 further comprising roller means, spaced from said wiper plates in said first direction, for feeding discrete media to be printed into operative association with said wiper plates and transport elements, said roller means comprising first and second rollers rotatable about parallel axes, perpendicular to said transport direction, and means for spring biasing said rollers together, at least one of said rollers having a deformable circumferential surface for engaging discrete media elements.

9. Apparatus as recited in claim 8 wherein the spacing between said roller means and a wiper plate, and between wiper plates on the same side of said print heads, is less than the length of the smallest typical discrete media to be printed with said apparatus.

10. Apparatus as recited in claim 1 further comprising flange means extending from opposite sides of said wiper plate, in a direction generally perpendicular to said transport direction, and turned upwardly with respect to said transport means.

11. A printing assembly for printing discrete media elements, comprising:
a plurality of ink jet print heads which project ink in a first direction from an orifice;
means for mounting said print heads;
transport elements for moving discrete media elements past said print heads;
means for powering said transport elements to effect movement of discrete media elements in a second direction; and
said print head mounting means mounting said print heads above said transport elements so that said first direction is disposed with respect to said second direction, and so that said print heads are spaced from said transport elements generally in said first direction, so that ink projected by said print heads will not rebound toward said print heads and clog the orifices thereof, yet the print heads will print clearly defined characters; and wherein said transport elements comprise a plurality of endless belts, powered by rollers, and moving in said second direction; and further comprising means for holding the discrete elements in positive, non-slipping contact with said transport elements during printing on the discrete elements by said print heads, said holding means comprising at least one transport wiper comprising a smooth surfaced plate having first and second ends spaced from each other in said first direction with the first end preceding the second end in said second direction, and lever means mounting said plate to said frame at said first and second ends thereof so that said plate may move generally in said first direction toward and away from said transport elements.

12. Apparatus as recited in claim 11 wherein said print head mounting means comprise means for mounting said print heads so that said first direction is at an angle of about 87° with respect to said second direction.

13. Apparatus as recited in claim 12 wherein said second direction is essentially horizontal, and said first direction is generally vertical.

14. Apparatus as recited in claim 13 wherein said transport elements comprise at least one endless belt mounted by a roller at the furthermost portion thereof in said second direction; and further comprising an exit roller having an axis of rotation perpendicular to said second direction and generally transverse to said first direction; and further comprising means for mounting said exit roller so that it engages an element of media at said furthermost portion thereof in said second direction so that it is held generally horizontally and does not slide on, and smear, a previously printed and discharged element.

15. Apparatus as recited in claim 11 further comprising a feed roller and a selector bar spaced from each other a first spacing generally in said first direction, and for feeding discrete media elements to said transport elements, wherein said transport elements have a second spacing from said print heads generally in said first direction directly proportional to said first spacing; and further comprising means for simultaneously adjusting said first and second spacings to accommodate different thicknesses of discrete media elements, and so that said first and second spacings always automatically retain the same proportional relationship to each other.

16. Apparatus as recited in claim 15 wherein said means for simultaneously adjusting said first and second spacings comprise a pair of outer shafts comprising said means for mounting said print heads, and a pair of inner eccentric shafts engaging said outer shafts, an outer portion of said selector bar, and an inner eccentric shaft engaging said outer portion of said selector bar, all of said eccentric shafts having the same eccentricity; and means for tying said inner eccentric shafts together so that rotation of one effects rotation of the others; and means for effecting rotation of one of said eccentric inner shafts.

17. Apparatus as recited in claim 16 further comprising locking plates associated with each of said outer shafts and selector bar with respect to said inner eccentric shafts so that all inner shafts are aligned parallel with elements below them and can be replaced without disturbing the relative parallel alignment.

18. Apparatus as recited in claim 11 wherein said means for mounting said print heads comprising: a first carriage for mounting all except one of said print heads and means for mounting said first carriage for movement in a third direction, substantially perpendicular to both said first and second directions; and a second carriage for mounting one of said print heads, and means for mounting said second carriage for movement in said third direction, and with respect to said first carriage.

19. Apparatus for printing discrete media elements, comprising:

a plurality of ink jet print heads which project ink in a first direction from an orifice;

means for mounting said print heads;

transport elements for moving discrete media elements past said print heads;

means for powering said transport elements to effect movement of discrete media elements in a second direction; and said print head mounting means mounting said print heads above said transport elements so that said first direction is disposed with respect to said second direction, and so that said print heads are spaced from said transport elements generally in said first direction, so that ink projected by said print heads will not rebound toward said print heads and clog the orifices thereof, yet the print heads will print clearly defined characters; and wherein said transport elements comprise a plurality of endless belts, powered by rollers, and moving in said second direction; and further comprising means for holding the discrete elements in positive, non-slipping contact with said transport elements during printing on the discrete elements by said print heads, said holding means comprising at least one transport wiper comprising a smooth surfaced plate having first and second ends spaced from each other in said first direction with the first end preceding the second end in said second direction, and lever means mounting said plate to said frame at said first and second ends thereof so that said plate may move generally in said first direction toward and away from said transport elements; and means for feeding discrete media elements to said transport elements, said feeding means comprising: a support for discrete elements; a first feed roller disposed adjacent to said support in said second direction and rotatable about a first axis, generally perpendicular to both said first and second directions; first means for effecting rotation of said first roller about said first axis; a second feed roller disposed on the opposite side of said first feed roller from said support and rotatable about a second axis parallel to said first axis; and second means, distinct from said first means, for effecting rotation of said second roller about said second axis; means for sensing the position of a discrete media element being fed by said feed rollers; and control means for controlling said feed roller rotating means so that said second feed roller is operated substantially continuously, and said first roller is operated intermittently in dependence upon the position of a discrete media element being fed thereby.

20. A printing assembly for printing discrete media elements, comprising:

a plurality of print heads;

transport elements for moving discrete media elements past said print heads;

means for mounting said print heads spaced from said transport elements in a first direction;

means for powering said transport elements to effect movement of discrete media elements in a second direction; and means for feeding discrete media elements to said transport means, said feeding means comprising a support for discrete elements; a first feed roller disposed adjacent to said support in said second direction and rotatable about a first axis, generally perpendicular to both said first and second directions; first means for effecting rotation of said first roller about said first axis; a second feed roller disposed on the opposite side of said first feed roller from said support and rotatable about a second axis parallel to said first axis; and second means, distinct from said first means, for effecting rotation of said second roller about said second axis; means for sensing the position of a discrete media element being fed by said feed rollers; and control means for controlling said feed roller rotating means so that second feed roller is operated substantially continuously, and said first roller is operated intermittently in dependence upon the position of a discrete media element being fed thereby.

21. Apparatus as recited in claim 20 further comprising a selector bar positioned above said second feed roller and defining a predetermined, but adjustable gap generally in said first direction, between the outer peripheral surface thereof and said second roller.

22. Apparatus as recited in claim 21 wherein said selector bar has a first abrasive strip thereon positioned to engage a discrete media element as it is being fed to said second roller by said first roller, and a second abrasive strip thereon, circumferentially spaced from said first strip; and further comprising means for mounting said selector bar so that when said first strip wears down said second strip can be positioned with respect to said second roller where said first strip was positioned.

23. Apparatus as recited in claim 20 wherein said means for feeding said discrete elements further comprises a pair of pinch rollers biased together and located on the opposite side of said second feed roller from said first said feed roller; and wherein said sensing means comprises a sensing element disposed between said second feed roller and said pinch rollers.

24. Apparatus as recited in claim 20 further comprising friction brake means associated with said first feed roller for stopping rotation of said first roller, due to inertia, once operation of said first rotating means is interrupted.

25. Apparatus as recited in claim 20 further comprising a pair of pinch rollers, biased into contact with each other, and at least one of said pinch rollers having a deformable surface; said pinch rollers rotatable about axes parallel to the axes of rotation of said first and second rollers, and disposed between said second roller and said transport means.

26. A printing assembly for printing discrete media elements, comprising:

a plurality of print heads;

transport means for moving discrete media elements past said print heads in a second direction;

means for mounting said print heads spaced from said transport means in a first direction, generally transverse to said second direction;

a feed roller and a selector bar spaced from each other a second spacing generally in said first direction directly proportional to said first spacing; and means for simultaneously adjusting said first and second spacings to accommodate different thicknesses of discrete media elements, and so that said first and second spacings automatically always retain the same proportional relationship to each other.

27. Apparatus as recited in claim 26 wherein said means for simultaneously adjusting said first and second spacings comprise a pair of outer shafts comprising said means for mounting said print heads, and a pair of inner eccentric shafts engaging said outer shafts, an outer portion of said selector bar, and an inner eccentric shaft engaging said outer portion of said selector bar, all of said eccentric shafts having the same eccentricity; and means for tying said inner eccentric shafts together so that rotation of one effects rotation of the others; and means for effecting rotation of one of said eccentric inner shafts.

28. A printing assembly for printing discrete media elements, comprising:

a mounting frame;

a plurality of print heads on said frame;

transport means for moving discrete media elements past said print heads on said mounting frame in a second direction;

means for mounting said print heads on said frame spaced from said transport means in a first direction, generally transverse to said second direction; and said means for mounting said print heads comprising:

a first carriage for mounting all except one of said print heads, and means for mounting said first carriage for movement in a third direction, substantially perpendicular to both said first and second directions; a second carriage for mounting one of said print heads, and means for mounting said second carriage for movement in said third direction; and means for mounting said carriages for movement in said first direction.

29. An assembly as recited in claim 28 further comprising means for holding the discrete elements in positive non-slipping contact with said transport means during printing on the discrete elements by said print heads, said holding means comprising at least one transport wiper comprising a smooth surfaced plate biased into engagement with said transport elements, and having upwardly slanted side edges, said transport wiper operatively mounted to said platforms for movement in said third direction therewith, said upturned edges of said wiper elements preventing catching of said wiper elements on said transport elements during movement in said third direction.

* * * * *